United States Patent
Floyd, III et al.

(10) Patent No.: US 9,106,610 B2
(45) Date of Patent: Aug. 11, 2015

(54) REGIONAL FIREWALL CLUSTERING IN A NETWORKED COMPUTING ENVIRONMENT

(71) Applicant: International Business Machines Corporation, Armonk, NY (US)

(72) Inventors: Robert K. Floyd, III, Richmond, VT (US); Baiju D. Mandalia, Boca Raton, FL (US); Robert P. Monaco, Croton, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/913,022

(22) Filed: Jun. 7, 2013

(65) Prior Publication Data

US 2014/0366119 A1  Dec. 11, 2014

(51) Int. Cl.
*H04L 29/06* (2006.01)

(52) U.S. Cl.
CPC ............. *H04L 63/0218* (2013.01); *H04L 63/02* (2013.01)

(58) Field of Classification Search
CPC ............................ H04L 63/0218; H04L 63/02
USPC ...................................................... 726/11–13
See application file for complete search history.

(56) References Cited

U.S. PATENT DOCUMENTS

| | | | |
|---|---|---|---|
| 5,968,176 A | 10/1999 | Nessett et al. | |
| 6,219,706 B1 * | 4/2001 | Fan et al. | 709/225 |
| 6,880,089 B1 | 4/2005 | Bommareddy et al. | |
| 6,950,947 B1 * | 9/2005 | Purtell et al. | 726/12 |
| 7,055,173 B1 | 5/2006 | Chaganty et al. | |
| 7,313,618 B2 | 12/2007 | Braemer et al. | |
| 7,447,796 B2 * | 11/2008 | Forrester | 709/238 |
| 7,555,772 B2 | 6/2009 | Shu et al. | |
| 7,747,776 B2 * | 6/2010 | Forrester | 709/238 |
| 7,853,998 B2 | 12/2010 | Blaisdell et al. | |
| 7,886,349 B2 * | 2/2011 | Taglienti et al. | 726/11 |
| 8,042,167 B2 | 10/2011 | Fulp et al. | |
| 8,082,578 B2 | 12/2011 | Izatt et al. | |
| 8,185,946 B2 | 5/2012 | Shu et al. | |

(Continued)

FOREIGN PATENT DOCUMENTS

| | | |
|---|---|---|
| CN | 1716869 A | 1/2006 |
| CN | 1791073 A | 6/2006 |
| CN | 101316271 A | 12/2008 |

OTHER PUBLICATIONS

Xiao Qi Zhi, Informational Materials for IDS, Date of WIPO Office Action Sep. 5, 2014, 4 pages.

(Continued)

*Primary Examiner* — Linglan Edwards
(74) *Attorney, Agent, or Firm* — William E. Schiesser; Keohane & D'Alessandro PLLC; Maxine L. Barasch

(57) ABSTRACT

An approach for regional firewall clustering for optimal state-sharing of different sites in a virtualized/networked (e.g., cloud) computing environment is provided. In a typical embodiment, each firewall in a given region is informed of its peer firewalls via a registration process with a centralized server. Each firewall opens up an Internet protocol (IP)-based communication channel to each of its peers in the region to share state table information. This allows for asymmetrical firewall flows through the network and allows routing protocols to ascertain the best path to a given destination without having to take firewall placement into consideration.

14 Claims, 8 Drawing Sheets

(56) References Cited

U.S. PATENT DOCUMENTS

| | | | |
|---|---|---|---|
| 8,234,702 B2* | 7/2012 | Maes | 726/13 |
| 8,261,337 B1* | 9/2012 | Liu et al. | 726/11 |
| 8,763,106 B2* | 6/2014 | Minear et al. | 726/11 |
| 2003/0120788 A1* | 6/2003 | Berthaud et al. | 709/229 |
| 2008/0311911 A1* | 12/2008 | Koodli et al. | 455/436 |
| 2010/0005263 A1* | 1/2010 | Wu | 711/162 |
| 2010/0071050 A1 | 3/2010 | Wing | |
| 2010/0185680 A1* | 7/2010 | Gilboa | 707/802 |
| 2013/0195262 A1* | 8/2013 | Hanes et al. | 379/100.05 |

OTHER PUBLICATIONS

PCT Notification of Transmittal of the International Search Report and the Written Opinion of the International Searching Authority, or the Declaration, Date of Mailing, Sep. 5, 2014, 11 pages.

Maitland, J., "Keeping Control Isn't Easy", Chapter 4: Cloud-Based Infrastructure, SearchCloudComputing.com, 13 pages. No publication date cited.

Mell, P. et al., "The NIST Definition of Cloud Computing", National Institute of Standards and Technology, Information Technology Laboratory, Version 15, Oct. 7, 2009, 2 pages.

* cited by examiner

REGIONAL FIREWALL CLUSTERING IN A NETWORKED COMPUTING ENVIRONMENT

TECHNICAL FIELD

In general, embodiments of the present invention relate to computer networking. Specifically, embodiments of the present invention relate to managing packet flow between firewalls in a networked computing environment (e.g., a cloud computing environment).

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For that reason, many corporations, institutions, and even home users use a network firewall or similar device between their local network and the Internet. The firewall is typically a computerized network device that inspects network traffic that passes through it, permitting passage of desired network traffic based on a set of rules. Firewalls perform their filtering functions by observing communication packets, such as TCP/IP or other network protocol packets, and examining characteristics such as the source and destination of network addresses, what ports are being used, and the state or history of the connection. Some firewalls also examine packets traveling to or from a particular application, or act as a proxy device by processing and forwarding selected network requests between a protected user and external networked computers.

SUMMARY

Embodiments described herein provide an approach for regional firewall clustering for optimal state-sharing of different sites in a virtualized/networked (e.g., cloud) computing environment. In a typical embodiment, each firewall in a given region is informed of its peer firewalls via a registration process with a centralized server. Each firewall opens up an Internet protocol (IP)-based communication channel to each of its peers in the region to share state table information. This allows for asymmetrical firewall flows through the network and allows routing protocols to ascertain the best path to a given destination without having to take firewall placement into consideration.

A first aspect provides a method for managing a firewall cluster in a networked computing environment, comprising the computer-implemented steps of: receiving a packet at a first firewall in the firewall cluster between a source and a destination, wherein the packet has an unknown session state; reading a session state table to determine a session state match based on the source and destination; buffering the packet for the duration of a predefined time interval when a session state match is not found; and forwarding the packet to the destination when session state information is received from a second firewall in the firewall cluster prior to the expiration of the predefined time interval.

A second aspect provides a system for managing a firewall cluster in a networked computing environment, comprising: a first firewall in the firewall cluster configured to receive a packet from a source intended for a destination, wherein the packet has an unknown session state; a cluster synchronization server configured to store a session state table; the first firewall further configured to read the session state table to determine a session state match based on the source and destination; the first firewall further configured to buffer the packet for the duration of a predefined time interval when a session state match is not found; and the first firewall further configured to forward the packet to the destination when session state information is received from a second firewall in the firewall cluster prior to the expiration of the predefined time interval.

A third aspect provides computer program product for managing a firewall cluster in a networked computing environment, the computer program product comprising a computer readable storage media, and program instructions stored on the computer readable storage media, to: receive a packet at a firewall between a source and a destination, wherein the packet has an unknown session state; read a session state table to determine a session state match based on the source and destination; buffer the packet for the duration of a predefined time interval when a session state match is not found; and forward the packet to the destination when session state information is received prior to the expiration of the predefined time interval.

BRIEF DESCRIPTION OF THE DRAWINGS

These and other features of this invention will be more readily understood from the following detailed description of the various aspects of the invention taken in conjunction with the accompanying drawings in which.

Figure 1:
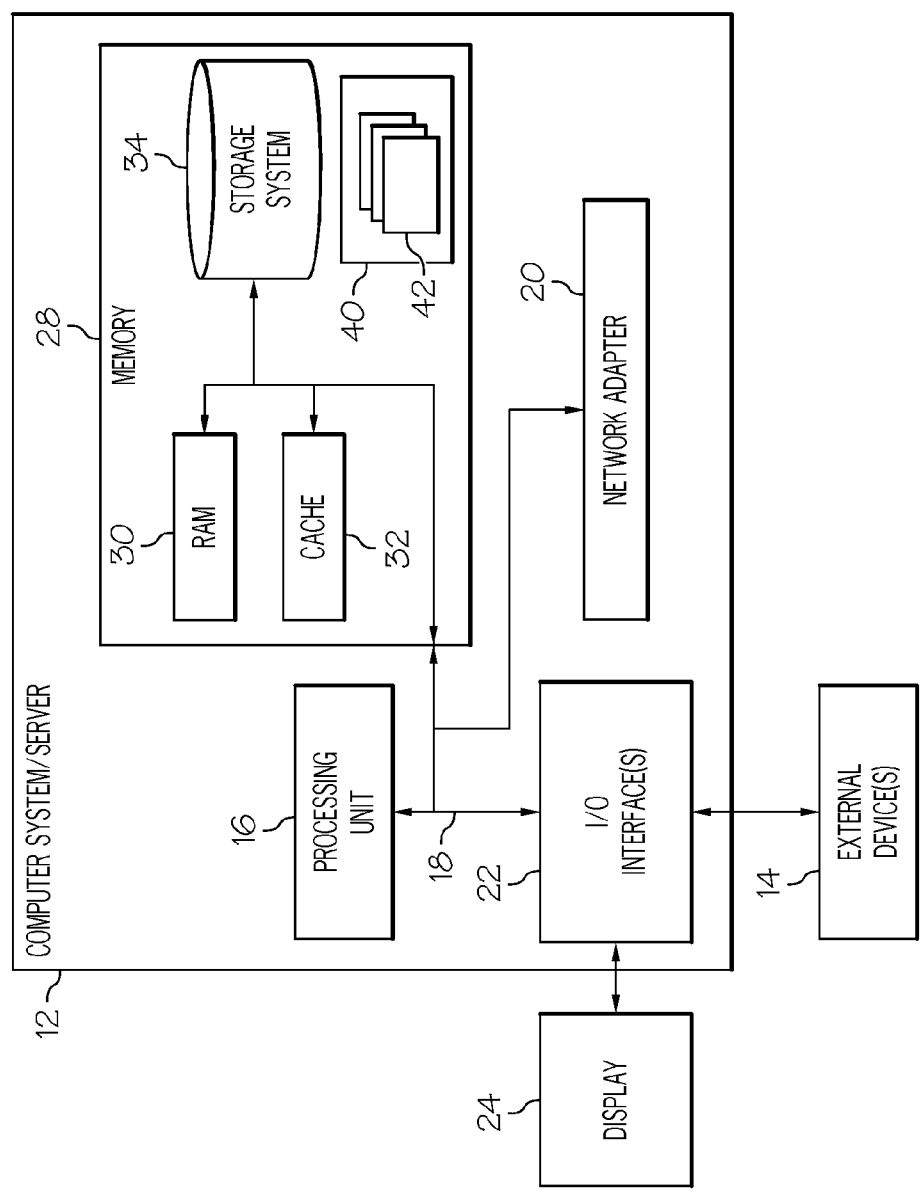
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. As used herein, the term "region" refers to any area or division of a networked computing environment having definable characteristics and/or fixed boundaries.

As indicated above, approaches for packet flow management between firewalls in a virtualized/networked (e.g., cloud) computing environment are provided. In a typical embodiment, historical command usage within a server environment is analyzed to determine the characteristics of the commands being run against a cloud resource to determine with a confidence rating the likelihood the commands are being executed by a certain user. Such an approach allows for more efficient user identity management in order to optimize cloud security and system administration.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
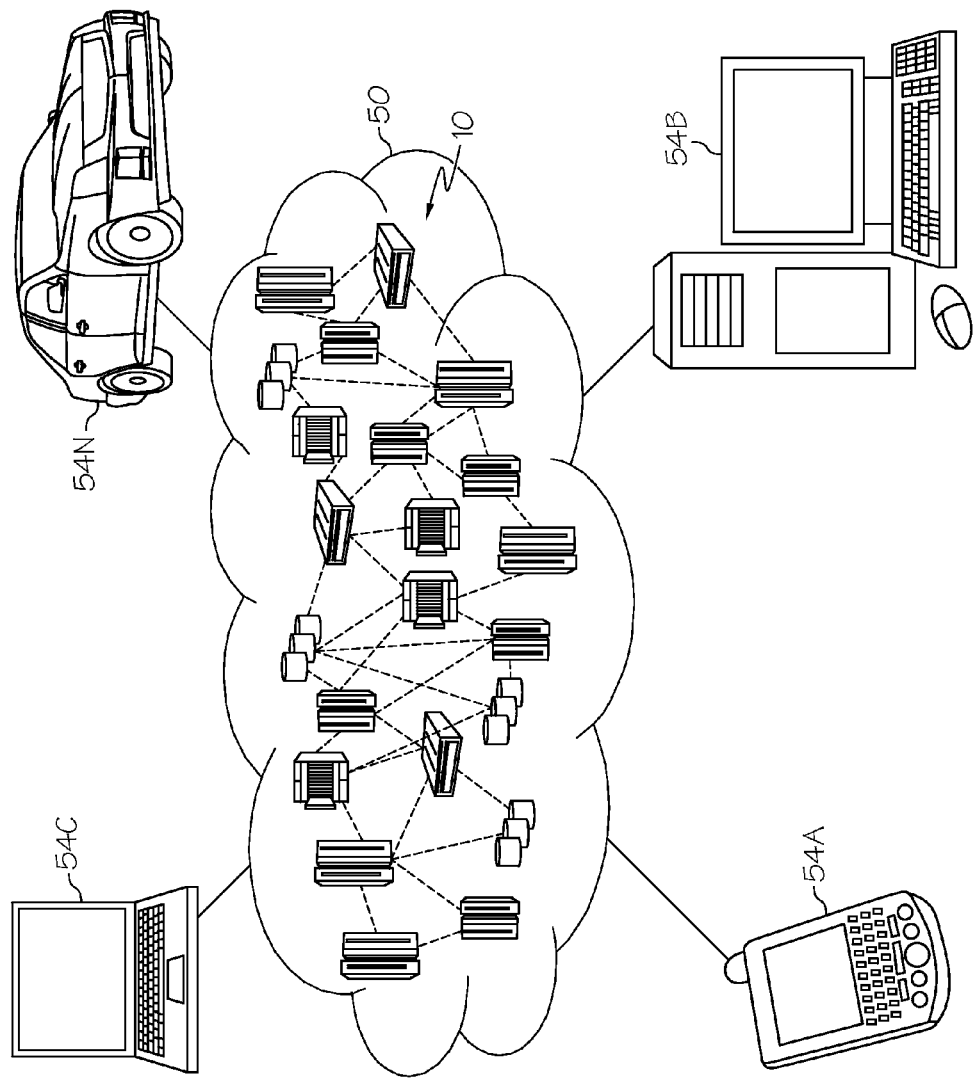
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
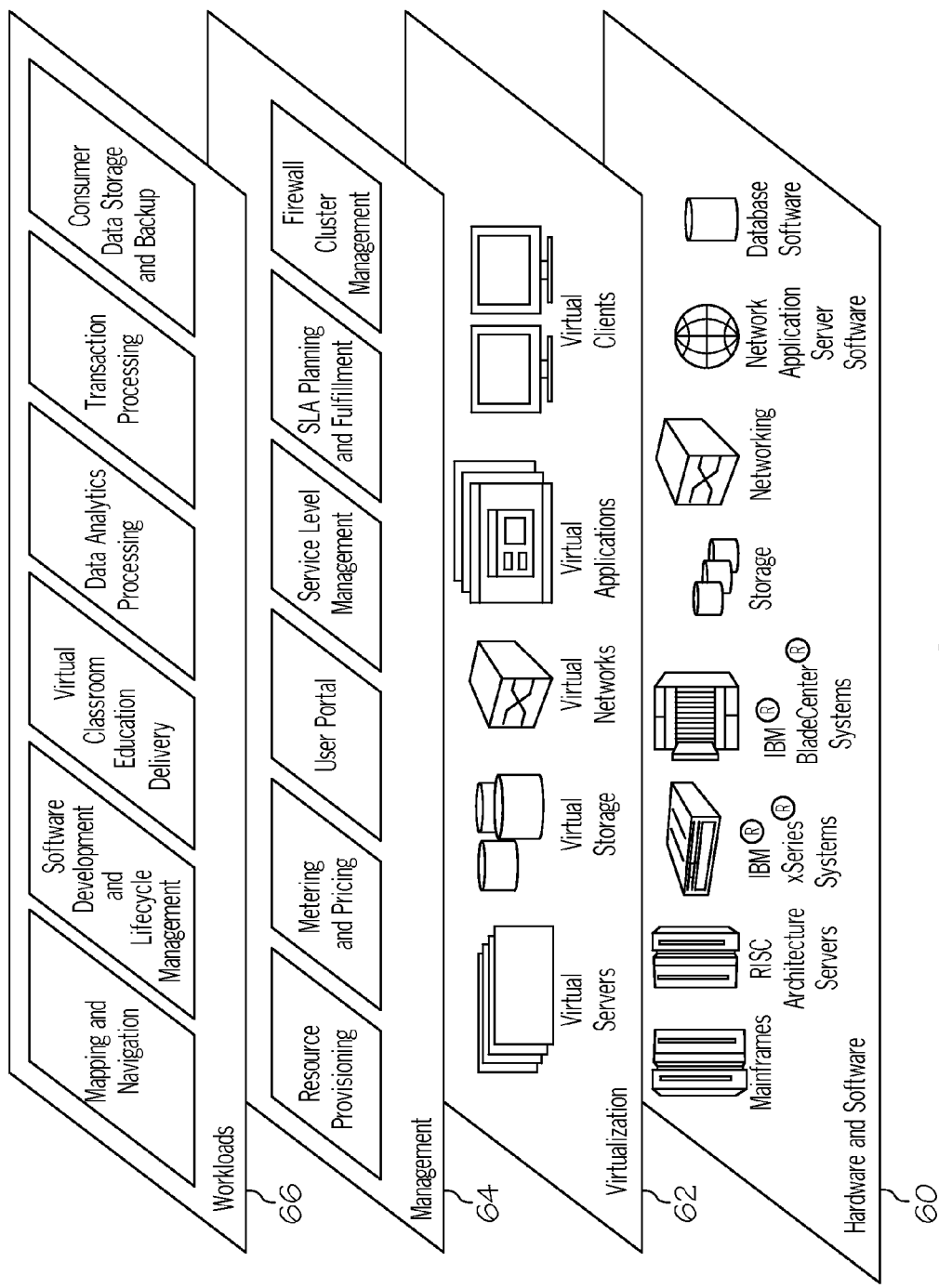
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is firewall cluster management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the firewall cluster management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

A firewall can either be software-based or hardware-based and is used to help keep a network secure. A firewall within a networked computing environment provides various network flow control functions, such as inspecting network packets and dropping or rejecting network packets based on a set of firewall filtering rules. Firewalls typically perform their filtering functions by observing communication packets, such as TCP/IP or other network protocol packets, and examining characteristics such as the state of the connection. In computing, a stateful firewall (any firewall that performs stateful packet inspection (SPI) or stateful inspection) is a firewall that keeps track of the state of network connections traveling across it. Stateful firewalls must be able to see both sides of a network conversation in order to properly observe and filter the connection. The firewall is programmed to distinguish legitimate packets for different types of connections. Only packets matching a known active connection will be allowed by the firewall; others will be rejected (or dropped).

Firewall clustering is typically done locally with firewalls not being farther than the reach of an ethernet cable and implemented in redundant pairs. This pairing limits the multi-pathing available in modern networks and forces symmetry to Internet protocol (IP) communication that is not always easy or efficient to implement on the network. As networks grow and become more complex, alternate paths become viable and the risk of asymmetric flows breaking across a firewall increases. When a flow is asymmetric with current firewall technology, it goes in one firewall pair and out another. The inability of the firewalls to share states leads them to receive unexpected packets for unknown sessions. The standard firewall behavior for this condition is to drop the packet.

Figure 4:
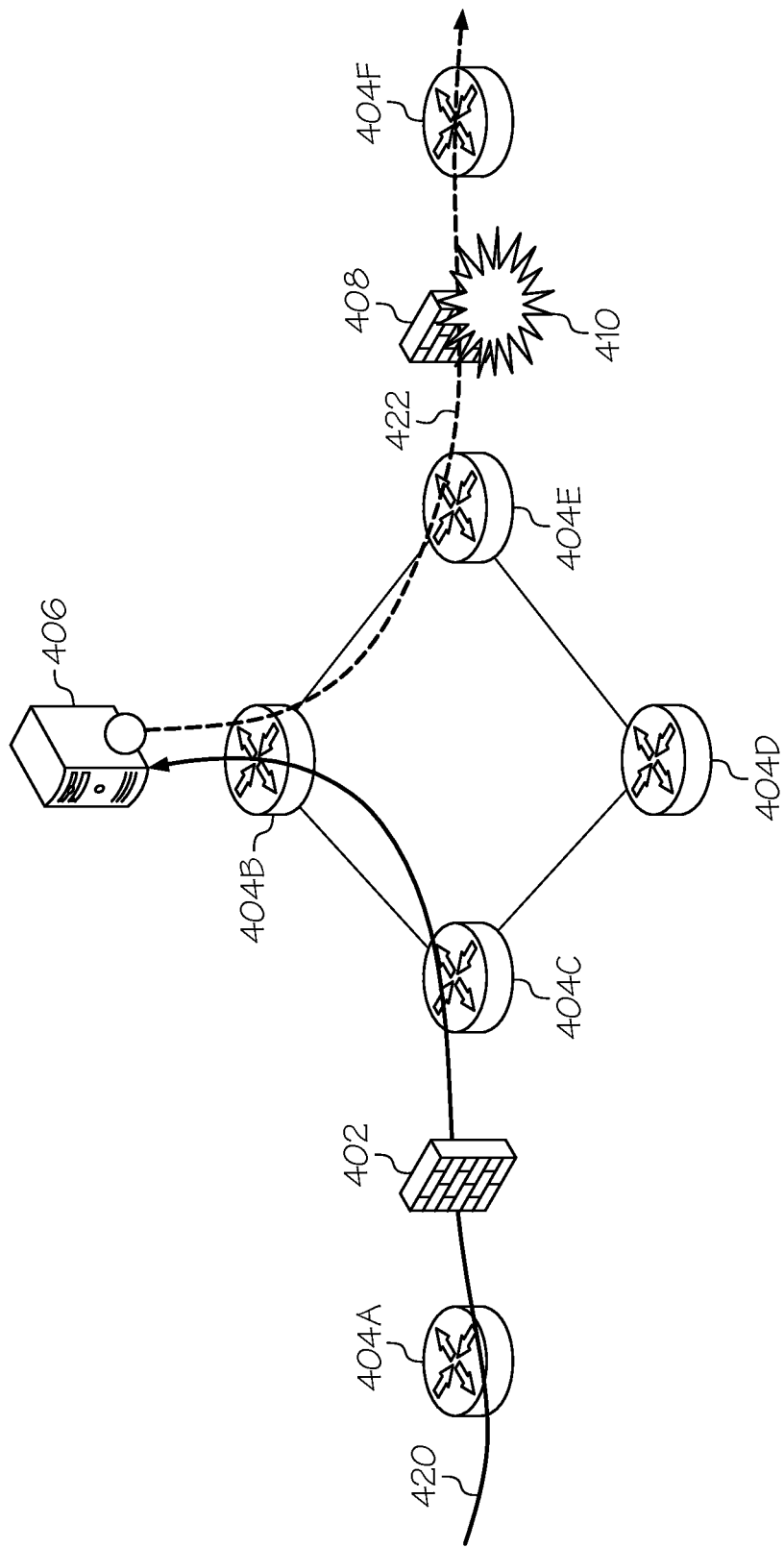
FIG. 4 depicts an architectural diagram showing asymmetric packet flow in a stateless firewall filter configuration.

FIG. 4 depicts an architectural diagram showing asymmetric packet flow in a stateless firewall filter configuration. The diagram includes firewall pair 402, routers 404A-F, server 406, and firewall pair 408. As shown, a session initiation packet comes in through firewall pair 402 from a client (not shown) along network path 420. Server 406 receives the packet and forwards a reply. Router 404B determines a better path back to the client along network path 422. Firewall pair 408 is unaware of the session and drops the packet at 410.

To work around the issue of packets being dropped, the firewalls are decoupled from their local pairing and can operate independently across greater distances. The sharing of the state table is done in a way to maximize the efficiency of memory and central processing unit (CPU) resources on the device. Rather than dropping an unknown packet when it arrives, the firewalls will hold it for a predetermined amount of time to see if synchronized state information is forthcoming from another firewall in the cluster. If it is not, then the packet is dropped and the memory space is cleared.

With this arrangement, there may be multiple secure and active paths in the network with firewalls being able to exchange state information with multiple pairs or even single firewalls. This allows for maximum flexibility in the network as sites can share Internet or extranet resources typically secured by a firewall in a way that better supports network load balancing and dynamic failover.

Firewalls register with a centralized cluster synchronization server that informs all firewalls in a predefined region of their peers. In one example, WAN bandwidth is used to determine optimal firewall registration paths. Each firewall opens up a communication channel (IP-based) to each of its peer in the region to share state table information. This allows for asymmetrical firewall flows through the network and allows routing protocols to ascertain the best path to a given destination without having to take firewall placement into consideration. Firewalls in a cluster derive a cluster delay interval by measuring round-trip time (RTT) through the communication channel. The process of determining the cluster delay interval is described in more detail below with reference to FIG. 6. Packets received that are allowed by the regional policy (all firewalls must have the same security policy in a given region) but have an unknown or incorrect state are kept in the firewall's memory until the cluster delay interval is expired. If updated session state information arrives from another firewall in the cluster for the packet, then it is allowed; otherwise, it is dropped once the cluster delay interval is expired.

Figure 5:
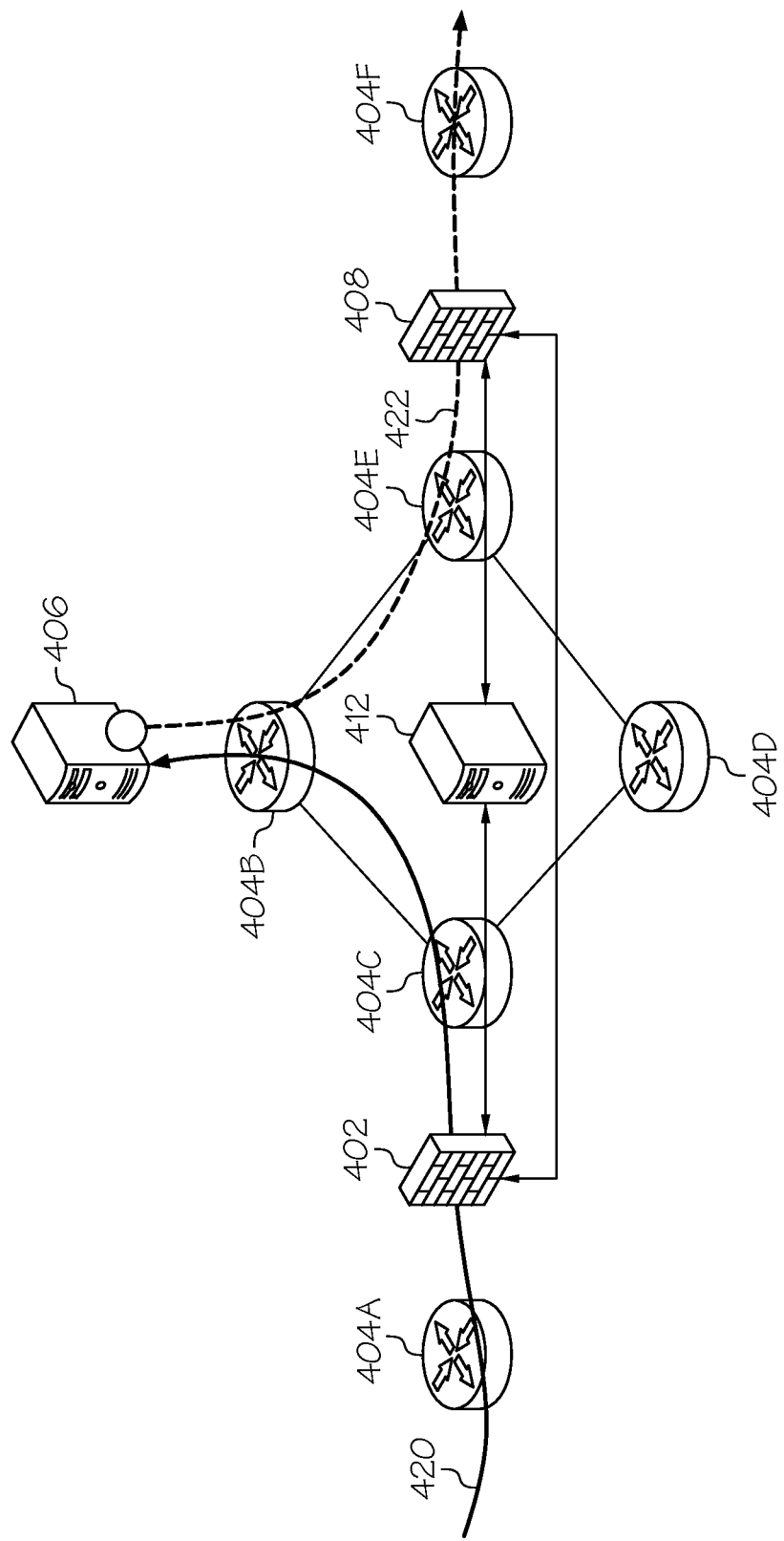
FIG. 5 depicts an architectural diagram according to an embodiment of the present invention.

Referring now to FIG. 5, an architectural diagram according to an embodiment of the present invention is depicted. The diagram includes firewall pair 402, routers 404A-F, server 406, firewall pair 408, and cluster synchronization server 412. As shown, a session initiation packet comes in through firewall pair 402 from a client (not shown) along network path 420. Firewall pair 402 forwards the packet to firewall cluster synchronization server 412. The firewall cluster synchronization server 412 forwards the state information from firewall pair 402 to all firewalls configured in its region (e.g. firewall pair 408). Firewalls in the same region have an Internet protocol (IP) control channel set up to measure latency between them. If firewall pair 408 receives a packet with an unknown session state, it will hold the packet for the duration of the cluster delay interval. The process of determining the cluster delay interval is described in more detail below with reference to FIG. 6. Cluster synchronization server 412 receives the packet and forwards a reply. Router 404B determines a better path back to the client along network path 422. Due to state synchronization across the region, the session is now known to firewall pair 408 and firewall pair 408 forwards the packet. Sequence numbers and state information are sent back to the cluster synchronization server 412. The cluster synchronization server 412 passes session state information between firewall pair 402 and firewall pair 408 for the life of the session.

Figure 6:
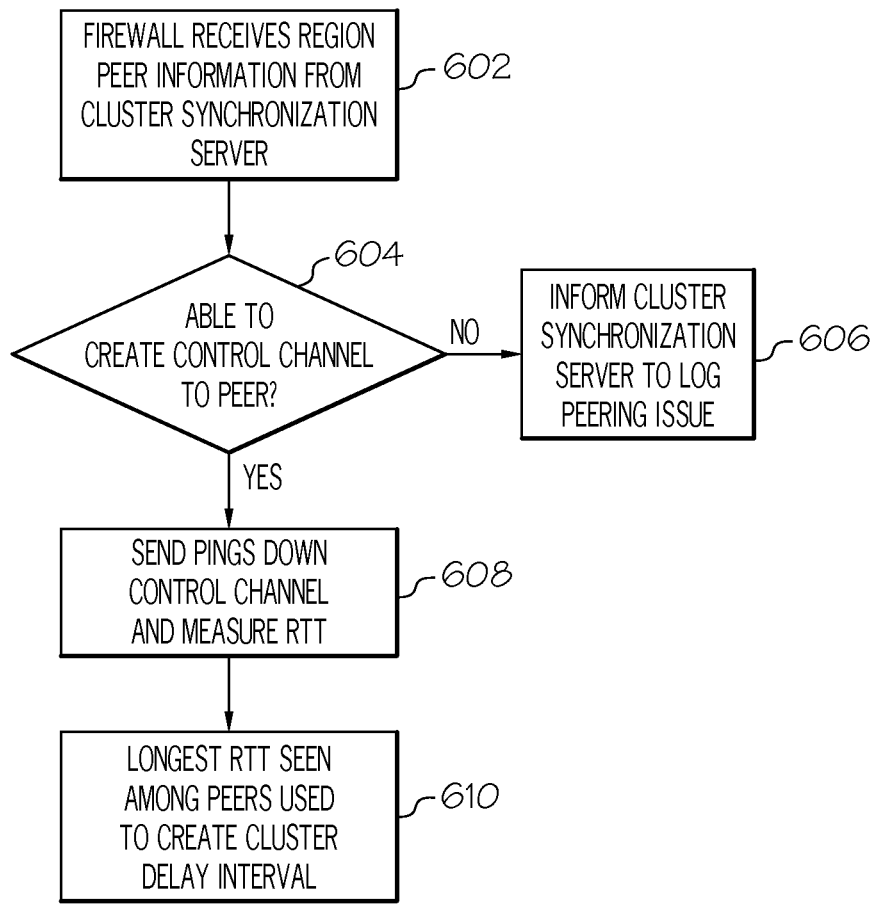
FIG. 6 depicts a method flow diagram for determining a cluster delay interval according to an embodiment of the present invention.

FIG. 6 depicts a method flow diagram for determining a cluster delay interval according to an embodiment of the present invention. At 602, a firewall pair receives region peer information from a cluster synchronization server. At 604, the firewall pair attempts to create a control channel to a peer in the region based on the received region peer information. If unable to create the control channel, the firewall pair informs the cluster server of the peering issue at 606. In one example, the firewall pair informs the cluster server to log the peering issue. If the control channel is created, the firewall pair sends pings down the control channel and measures the round-trip time (RTT) of the pings at 608. Steps 604 through 608 are performed for each peer in the region. At 610, the longest RTT seen among the peers is used to create a cluster delay interval. It should be noted that, in the process flow chart of FIG. 6 described herein, some steps can be added, some steps may be omitted, the order of the steps may be rearranged, and/or some steps may be performed simultaneously.

Figure 7:
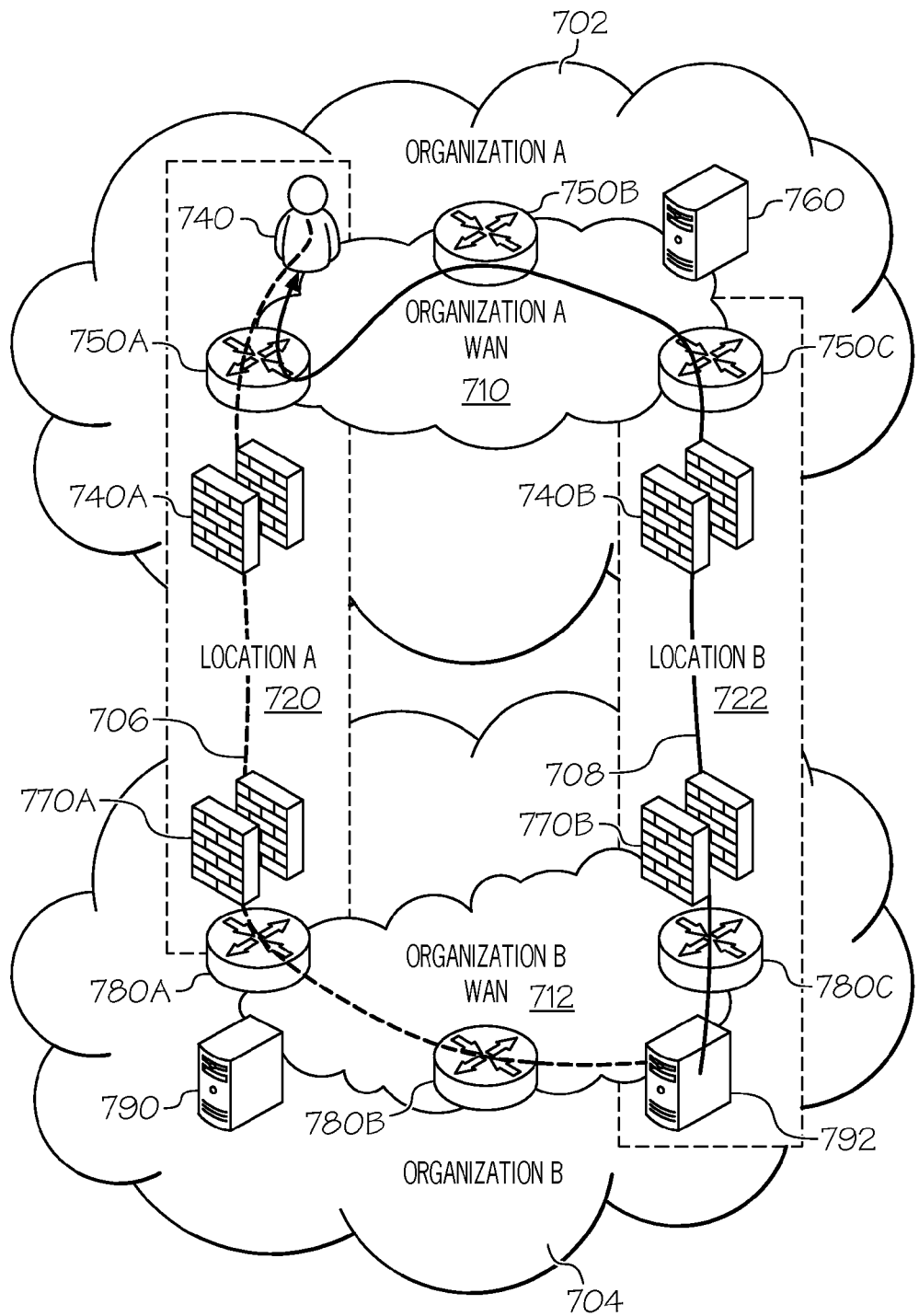
FIG. 7 depicts an architectural diagram showing multi-pathing according to an embodiment of the present invention.

FIG. 7 depicts an architectural diagram showing a multi-pathing example according to an embodiment of the present invention. The diagram includes organization A 702 and organization B 704. Organization A 702 includes organization A wide area network (WAN) 710, organization A user 740, redundant firewall pairs 740A-B, routers 750A-C, and organization A cluster synchronization server 760. Organization B 704 includes organization B WAN 712, redundant firewall pairs 770A-B, routers 780A-C, organization B cluster synchronization server 790, and organization B partner services server 792.

With each organization having its own firewall clusters and regions, firewall flows may be asymmetric between organization A 702 and organization B 704. The proposed arrangement allows for dynamic failover between sites or even active/active between two locations (e.g., location A 720 and location B 722). Routing is now free to choose the best paths between the sites. For example, a packet from organization A user 740 takes the shortest network path (i.e., network path 706) to organization B partner services server 792. Organization B partner services server 792 takes the shortest path (i.e., network path 708) back to organization A 702.

The solution is dependent on wide area network (WAN) bandwidth. Routing depends on a routing metric (e.g., multiple serial digital signal 3s (DS3s) are better than T1). There is a correlation to underlying bandwidth. If a backup/alternate path is not viable due to bandwidth constraints, then it may not be used. However, it may be the routing protocols within the network that determine the network path and force symmetry in this case. Multiple paths should be used only if they are capable of passing the traffic.

Figure 8:
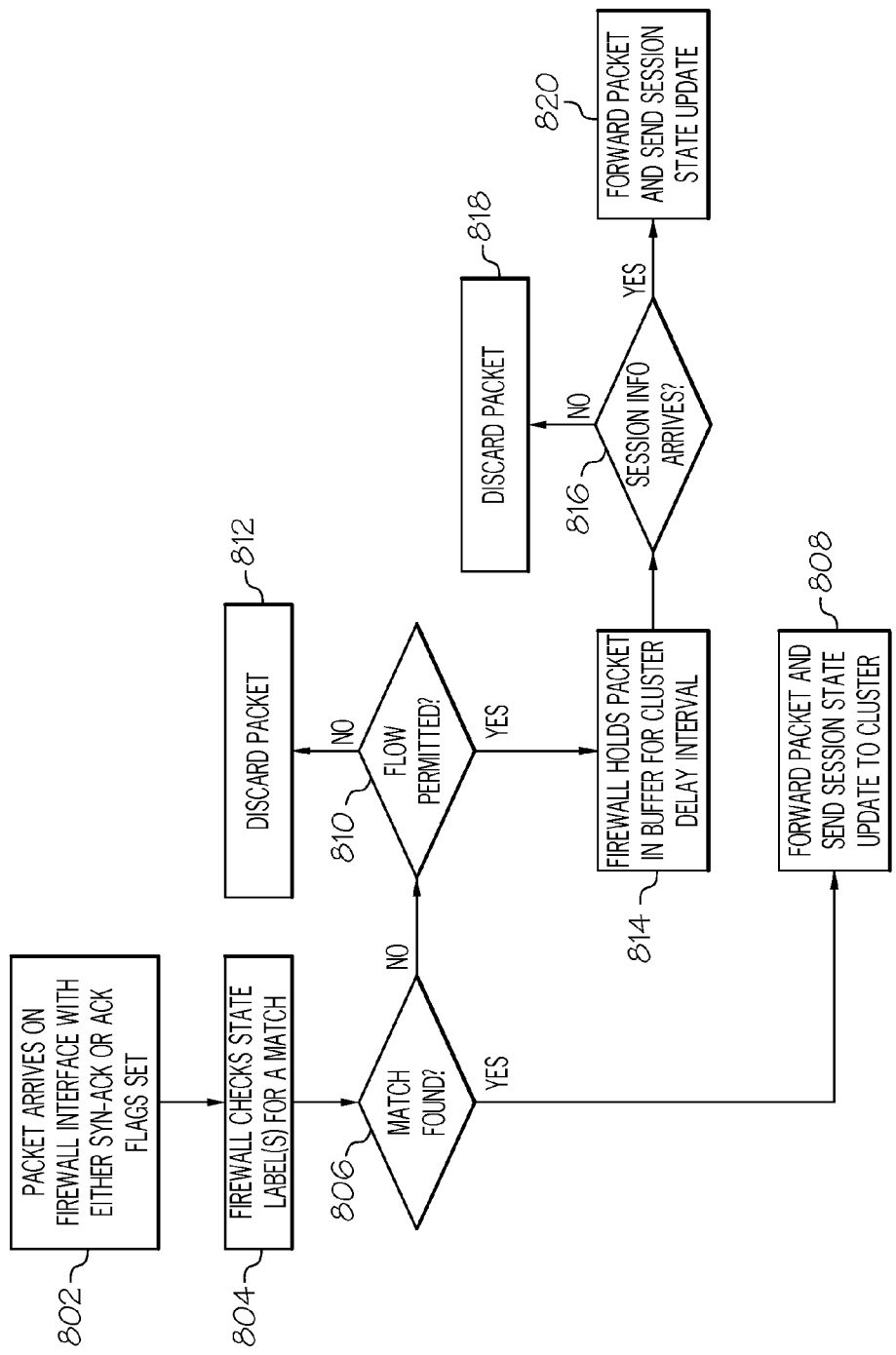
FIG. 8 depicts a method flow diagram according to an embodiment of the present invention.

FIG. 8 depicts a method flow diagram according to an embodiment of the present invention. At 802, a firewall receives a packet between a source and a destination with either Synchronize Acknowledge (SYN-ACK) or Acknowledge (ACK) flags set. At 804, the firewall checks a session state table (or tables) for a session state match. A session state table may reside on a cluster synchronization server and, in some examples, locally. At 806, a determination is made whether a matching known active connection is found between the source and destination. If a match is found, the packet is forwarded to the destination, and a session state update is sent to the cluster synchronization server at 808. If a matching known active connection is not found, a determination is made whether the packet received is allowed by the regional policy at 810. If not, the packet is discarded at 812. If the packet is allowed, the firewall holds the packet in a buffer for the duration of a cluster delay interval waiting for session state information to arrive at 814. A decision is made whether the session state information arrives prior to the expiration of the cluster delay interval at 816. If session state information does not arrive from another firewall in the cluster prior to the expiration of the cluster delay interval, the packet is discarded at 818. If session state information arrives from another firewall in the cluster prior to the expiration of the cluster delay interval, the packet is forwarded to the destination, and a session state update is sent to the cluster synchronization server at 820. It should be noted that, in the process flow chart of FIG. 8 described herein, some steps can be added, some steps may be omitted, the order of the steps may be rearranged, and/or some steps may be performed simultaneously.

While shown and described herein as a solution for firewall cluster management, it is understood that the invention further provides various alternative embodiments. For example, in one embodiment, the invention provides a computer-readable/useable medium that includes computer program code to enable a computer infrastructure to provide identity management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide firewall cluster management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for firewall cluster management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1) from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing a firewall cluster in a networked computing environment, comprising the computer-implemented steps of:

opening a communication channel between each firewall pair in the firewall cluster;

determining a round-trip time (RTT) value between each firewall pair in the firewall cluster using the respective communication channel;

defining a cluster delay time interval based on the highest round-trip time (RTT) value;

receiving a packet at a first firewall in the firewall cluster between a source and a destination, wherein the packet has an unknown session state;

reading a session state table to determine a session state match based on the source and destination;

buffering the packet for the duration of the cluster delay time interval when a session state match is not found; and forwarding the packet to the destination when session state information is received from a second firewall in the firewall cluster prior to the expiration of the cluster delay time interval.

2. The method of claim 1, further comprising the computer-implemented step of discarding the packet at the first firewall in the firewall cluster when state information is not received prior to the expiration of the cluster delay time interval.

3. The method of claim 1, wherein the computer-implemented step of determining a round-trip time (RTT) value between a firewall pair in the firewall cluster comprises pinging the second firewall in the firewall pair from the first firewall in the firewall pair.

4. The method of claim 1, further comprising the computer-implemented step of updating the session state table with session state information related to the source and destination.

5. The method of claim 1, wherein the method is performed by a service provider.

6. A system for managing a firewall cluster in a networked computing environment, comprising:

each firewall in the firewall cluster is configured to open a communication channel with each of its peers;

the each firewall configured to determine a round-trip time (RTT) value between itself and each peer using an appropriate communication channel;

a first firewall in the firewall cluster configured to receive a packet from a source intended for a destination, wherein the packet has an unknown session state;

a cluster synchronization server configured to store a session state table;

the first firewall further configured to read the session state table to determine a session state match based on the source and destination;

the first firewall further configured to buffer the packet for the duration of a cluster delay time interval when a session state match is not found, wherein the cluster delay time interval is based on the highest round trip (RTT) value; and the first firewall further configured to forward the packet to the destination when session state information is received from a second firewall in the firewall cluster prior to the expiration of the cluster delay time interval.

7. The system of claim 6, wherein the firewall is further configured to discard the packet when state information is not received prior to the expiration of the cluster delay time interval.

8. The system of claim 6, wherein a round-trip time (RTT) value between a firewall pair comprises pinging the second firewall in the firewall pair from the first firewall in the firewall pair.

9. The system of claim 6, wherein the firewall is further configured to update the session state table with session state information related to the source and destination.

10. The system of claim 6, wherein the networked computing environment comprises a cloud computing environment.

11. A computer program product for managing a firewall cluster in a networked computing environment, the computer program product comprising a computer readable hardware storage device, and program instructions stored on the computer readable storage media, to:

open a communication channel between each firewall pair in the firewall cluster;

determine a round-trip time (RTT) value between each firewall pair in the firewall cluster using the respective communication channel;

define a cluster delay time interval based on the highest round-trip time (RTT) value;

receive a packet at a first firewall in the firewall cluster between a source and a destination, wherein the packet has an unknown session state;

read a session state table to determine a session state match based on the source and destination;

buffering the packet for the duration of the cluster delay time interval when a session state match is not found; and forward the packet to the destination when session state information is received from a second firewall in the firewall cluster prior to the expiration of the cluster delay time interval.

12. The computer program product of claim 11, the computer readable hardware storage device further comprising instructions to discard the packet when state information is not received prior to the expiration of the cluster delay time interval.

13. The computer program product of claim 11, the computer readable hardware storage device further comprising instructions to determine a round-trip time (RTT) value between a firewall pair comprises pinging the second firewall in the firewall pair from the first firewall in the firewall pair.

14. The computer program product of claim 11, the computer readable hardware storage device further comprising instructions to update the session state table with session state information related to the source and destination.

\* \* \* \* \*